United States Patent
Colas et al.

(10) Patent No.: US 7,373,412 B2
(45) Date of Patent: May 13, 2008

(54) APPARATUS FOR SELECTING AND SORTING PACKETS FROM A PACKET DATA TRANSMISSION NETWORK

(75) Inventors: Gérard Colas, Versailles (FR); Christian Pitot, Bologne Billancourt (FR)

(73) Assignee: Thales (FR)

( * ) Notice: Subject to any disclaimer, the term of this patent is extended or adjusted under 35 U.S.C. 154(b) by 593 days.

(21) Appl. No.: 10/507,243

(22) PCT Filed: Mar. 7, 2003

(86) PCT No.: PCT/FR03/00745

§ 371 (c)(1), (2), (4) Date: Sep. 10, 2004

(87) PCT Pub. No.: WO03/079632

PCT Pub. Date: Sep. 25, 2003

(65) Prior Publication Data

US 2005/0172025 A1    Aug. 4, 2005

(30) Foreign Application Priority Data

Mar. 15, 2002    (FR) .................................. 02 03257

(51) Int. Cl.
*H04L 29/06* (2006.01)
*G06F 15/16* (2006.01)

(52) U.S. Cl. ...................... 709/230; 709/227; 709/229; 709/236

(58) Field of Classification Search ................ 709/230, 709/231, 232, 233, 234, 235, 236, 237, 238, 709/239, 240

See application file for complete search history.

(56) References Cited

U.S. PATENT DOCUMENTS

| | | | |
|---|---|---|---|
| 5,375,208 A | 12/1994 | Pitot | |
| 5,509,121 A * | 4/1996 | Nakata et al. | 709/230 |
| 5,701,315 A | 12/1997 | Pitot | |
| 5,719,577 A | 2/1998 | Pitot | |
| 5,778,206 A | 7/1998 | Pain | |

(Continued)

FOREIGN PATENT DOCUMENTS

| EP | 0 993 153 A | 4/2000 |
|---|---|---|
| WO | 02 15521 A | 2/2002 |

OTHER PUBLICATIONS

Stevens, W. Richard, "TCP/IP Illustrated, vol. 1: The Protocols," Dec. 31, 1993, Addison Wesley Professional, Sections 2.2, 3.2, 11.1-2, 17.3.*

(Continued)

*Primary Examiner*—Jeffrey Pwu
*Assistant Examiner*—Christopher Chan
(74) *Attorney, Agent, or Firm*—Lowe Hauptman Ham & Berner, LLP

(57) ABSTRACT

The invention relates to the selection and sorting, by a device having access to one or more packet transmission networks, of the packets relating to it, from among the entirety of the packets made available by the networks, given that the packets respect at least two layers of protocols or even more. It consists of a method of selecting and sorting that successively implements, in respect of searches for matching addresses, two directories of addresses, the first of so-called lower levels having as elements the various possible combinations of the values taken by the addressing information contained in the service information fields of the first two levels of protocols, the second so-called higher levels having as elements the addressing information contained in the service information fields of the protocols of levels higher than two, the elements of the first and second directories being linked by compatibility links targeting those that can simultaneously be in the service information fields of a packet relevant to the device.

9 Claims, 6 Drawing Sheets

U.S. PATENT DOCUMENTS

| | | | |
|---|---|---|---|
| 5,845,091 A * | 12/1998 | Dunne et al. | 709/240 |
| 5,920,566 A * | 7/1999 | Hendel et al. | 370/401 |
| 5,938,736 A * | 8/1999 | Muller et al. | 709/243 |
| 5,954,810 A | 9/1999 | Toillon | |
| 6,157,955 A * | 12/2000 | Narad et al. | 709/228 |
| 6,188,689 B1 * | 2/2001 | Katsube et al. | 370/389 |
| 6,262,976 B1 * | 7/2001 | McNamara | 370/254 |
| 6,397,243 B1 | 5/2002 | Colas | |
| 6,415,190 B1 | 7/2002 | Colas | |
| 6,430,188 B1 * | 8/2002 | Kadambi et al. | 370/398 |
| 6,519,655 B1 | 2/2003 | Pitot | |
| 6,571,300 B2 | 5/2003 | Pitot | |
| 6,768,738 B1 * | 7/2004 | Yazaki et al. | 370/392 |
| 6,842,453 B1 * | 1/2005 | Kloth et al. | 370/392 |
| 2002/0034180 A1 * | 3/2002 | Kroeger et al. | 370/392 |
| 2002/0112085 A1 * | 8/2002 | Berg | 709/250 |
| 2003/0126272 A1 * | 7/2003 | Corl et al. | 709/230 |

OTHER PUBLICATIONS

Gupta et al., "Algorithms for Packet Classification," Mar.-Apr. 2001, IEEE Network Magazine, IEEE Communications Society, pp. 24-42.*

Kumar V P et al "Beyond Best Effort: Router Architectures For the Differentiated Services of Tomorrow's Internet" IEEE Communications Magazine, IEEE Service Center, Piscataway, NJ, US vol. 36, No. 5 May 1, 1998 pp. 152-164.

Gupta P et al: "Packet Classification on Multiple Fields" Computer Communications Review, Association for Computing Machinery, New York, US, vol. 29, No. 4 Oct. 1999, pp. 147-160.

* cited by examiner

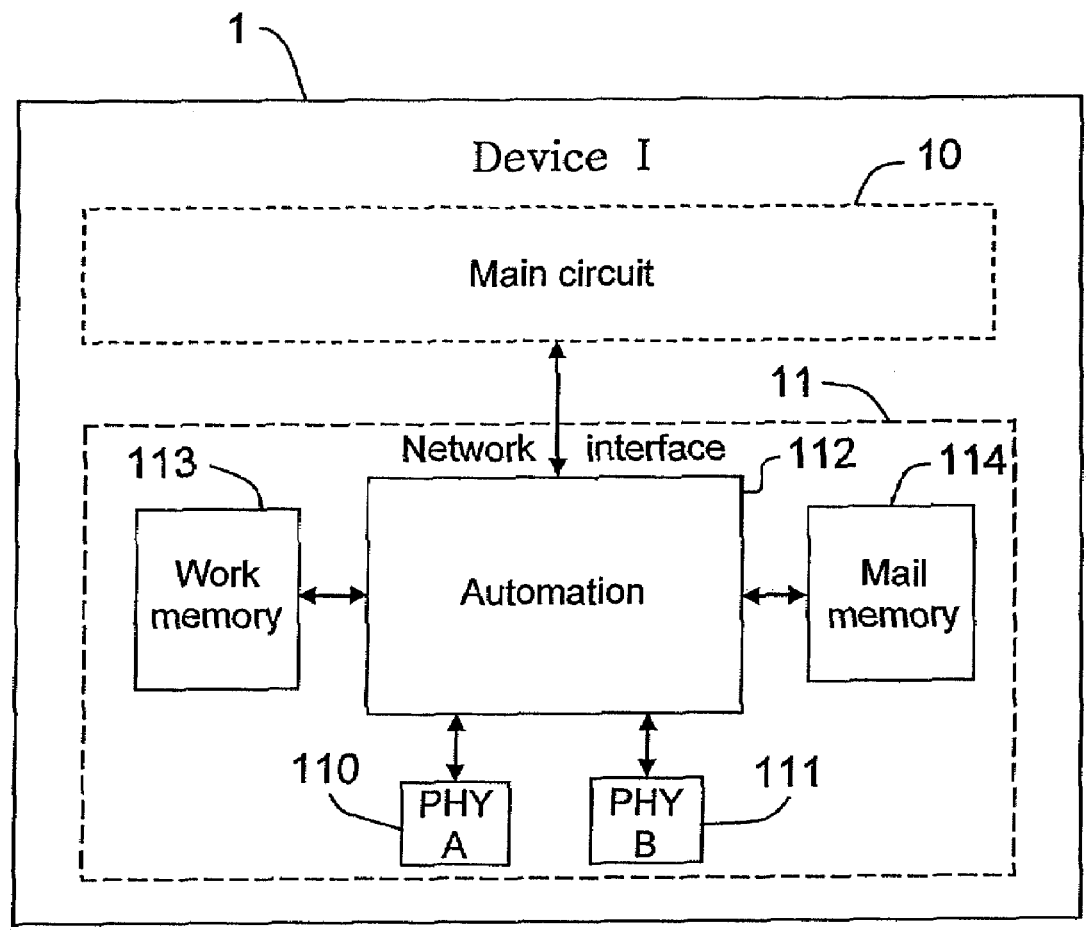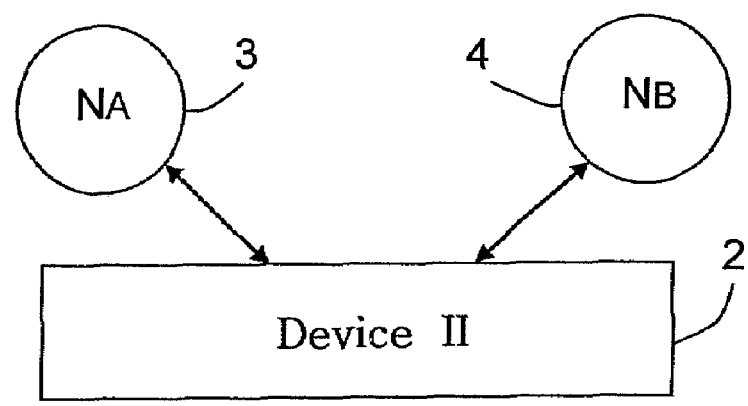
FIG.1

| Msg dsc | Message descriptors allocation list (120) | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
| 0 | Fragment identifier | | | | | | | | | | | Port Alias | | | | | | | | U | | | | | | | | | | | | | | | | |
| 1 | P P P P | | | | | | | | | | | Port Alias | | | | | | | | U | | | | | | Fragment ID | | | | | | | | | |
| 2 | P P P P | | | | | | | | | | | Port Alias | | | | | | | | U | | | | | | Fragment ID | | | | | | | | | |
| 3 | P P P P | | | | | | | | | | | Port Alias | | | | | | | | U | | | | | | Fragment ID | | | | | | | | | |
| 4 | P P P P | | | | | | | | | | | Port Alias | | | | | | | | U | | | | | | Fragment ID | | | | | | | | | |
| 5 | P P P P | | | | | | | | | | | Port Alias | | | | | | | | U | | | | | | Fragment ID | | | | | | | | | |
| 6 | P P P P | | | | | | | | | | | Port Alias | | | | | | | | U | | | | | | Fragment ID | | | | | | | | | |
| 7 | P P P P | | | | | | | | | | | Port Alias | | | | | | | | U | | | | | | Fragment ID | | | | | | | | | |
| 8 | P P P P | | | | | | | | | | | Port Alias | | | | | | | | U | | | | | | Fragment ID | | | | | | | | | |
| 9 | P P P P | | | | | | | | | | | Port Alias | | | | | | | | U | | | | | | Fragment ID | | | | | | | | | |
| A | P P P P | | | | | | | | | | | Port Alias | | | | | | | | U | | | | | | Fragment ID | | | | | | | | | |
| B | P P P P | | | | | | | | | | | Port Alias | | | | | | | | U | | | | | | Fragment ID | | | | | | | | | |
| C | P P P P | | | | | | | | | | | Port Alias | | | | | | | | U | | | | | | Fragment ID | | | | | | | | | |
| D | P P P P | | | | | | | | | | | Port Alias | | | | | | | | U | | | | | | Fragment ID | | | | | | | | | |
| E | P P P P | | | | | | | | | | | Port Alias | | | | | | | | U | | | | | | Fragment ID | | | | | | | | | |
| F | | | | | | | | | | | | Port Alias | | | | | | | | U | | | | | | Fragment identifier | | | | | | | | | |

FIG.6

APPARATUS FOR SELECTING AND SORTING PACKETS FROM A PACKET DATA TRANSMISSION NETWORK

CROSS-REFERENCE TO RELATED APPLICATIONS

The present application is based on International Application No. PCT/FR03/00745, filed on Mar. 7, 2003, entitled "METHOD OF SELECTING AND SORTING PACKETS PROVIDED TO A PIECE OF EQUIPMENT BY A DATA PACKET TRANSMISSION NETWORK", which in turn corresponds to FR 02/02257 filed on Mar. 15, 2002, and priority is hereby claimed under 35 USC §119 based on these applications. Each of these applications are hereby incorporated by reference in their entirety into this application.

FIELD OF THE INVENTION

The present invention concerns the processing of messages exchanged between devices by way of one or more packet data transmission networks. It relates more particularly to the filtering, by a device, of the entirety of packets made available by the packet data transmission network or networks so as to retain only those belonging to messages whose device is the destination and direct them, in the device, to a suitable reception port.

DESCRIPTION OF THE RELATED ART

The packets modulate the transmission signals conveyed by the physical transmission medium used by a network. They consist of longer or shorter datagrams or strings of binary elements separated into various successive fields, including a payload data field encapsulating a message or a portion of message constituting the payload of the network and service information fields making it possible to route the packet within the network and to specify certain characteristics of the payload data field so as to facilitate its utilization on exit from the network. The format of a packet, that is to say the decomposition into fields, of the datagram of which it consists, complies with precise rules known to the participants of the network and grouped together under the term physical layer protocol or else first level protocol.

The payload of the network occupying the payload data field of a packet constitutes a datagram itself. It may be organized, in its turn, into various successive fields, including a payload data field and service information fields relevant to the routing of the payload of the network, beyond the network itself, within an attached device. Its format also complies with precise rules grouped together under the term logical layer protocol. There are two layers of protocol to be utilized to determine the complete destination address of a packet and extract therefrom the useful data. It may even happen that the logical layer is subdivided and that there are more than two layers of protocol, the destination address of the packet being specified from protocol layer to protocol layer.

Among the packet data transmission networks to which the invention relates mention may be made of the Ethernet networks using, at the first level of the physical transmission layer, a packet or frame format complying with a "MAC" protocol (the acronym standing for "Media Access Control"), defined in the standards 802.3 and/or 802.2 drawn up by the Institute of Electrical and Electronics Engineers.

In a packet complying with the MAC IEEE 802.3/802.2 protocol, there is a payload data field, the so-called "Ethernet data field", and various service information fields in particular, one called the "MAC Destination Address" and another called the "LLC" (the acronym standing for "Logical Link Control") or else: "LPDU" (the acronym standing for "Logical Protocol Data Unit"). The MAC Destination Address service information field identifies on the network, the destination device or devices of the packet. The LLC/LPDU service information field holds various information regarding the second level corresponding to the layer immediately above the physical layer, including the identity of the protocol used for the formatting of the Ethernet data field.

The so-called second level protocol, used for the formatting of an Ethernet data field, may be either a proprietary protocol, specific to the sender and receiver devices hooked up by the Ethernet data transmission network, or a standardized protocol, with a wider audience. The standardized protocols used most commonly for the formatting of an Ethernet data field are the Internet protocols complying with the RFC standards issued by the DARPA (the acronym standing for "Defense Advanced Research Project Agency") and, from among those, the IP protocol (the acronym standing for "Internet Protocol") which can be used alone or in combination with a third level of protocol such as the TCP protocol (the acronym standing for "Transport Control Protocol"), the UDP protocol (the acronym standing for "User Datagram Protocol") or else the ICMP protocol (the acronym standing for "Internet Control Message Protocol").

Access by a device to a data transmission network is effected by way of a physical medium providing for the propagation of the transmission signals within the network, often the ambient medium or an electrical or optical cable, of a send/receive function often dubbed "Medium Dependant Interface and Physical Layer Device" and of a function often dubbed "Data Terminal Equipment".

The send/receive function consists, in the receive direction, in receiving the signals from the propagation medium and extracting therefrom their binary content.

The DTE function consists, in the receive direction, in utilizing the binary content of the signals received from the network through the intermediary of the send/receive function so as to extract therefrom the messages pertaining to the device concerned and to direct them within the device, to the appropriate reception port or ports.

When the data transmission network is of packet transmission type, each signal borrowing the transmission medium transports a data packet. The recognition, in the signals arriving from the propagation medium, of a data packet is the remit of the send/receive function which, in addition to the extraction of the binary content of the signals received from the network, is responsible for the detection of the start and the end of each packet received.

The DTE function provides for the temporary storage of the binary data stream originating from the send/receive function between the detection by the latter of a start and of an end of packet, the utilization time for the destination address figuring in the service information contained in the packet so as, either if the packet pertains to the device concerned, to select it and direct the useful data which it holds toward one or more reception ports of the device concerned, or if the packet does not pertain to the device concerned, to reject it. Very often, the DTE function furthermore checks the integrity of the data contained in a selected packet.

The send/receive function, which is very dependent on the physical properties of the transmission medium, is, in general, entrusted to one of the specialized circuits placed at the level of a network interface card mounted in the device to be attached to the network, whereas the DTE function which implements only logic operations on binary data can either form the subject of an accessory task entrusted to a computer performing other tasks devolved to the device attached to the network, or be entrusted to a microprocessor-based specialized automaton placed on the network interface card, on the side of the specialized circuits providing for the send/receive function.

When the packets made available to the device by the transmission network or networks can form the subject of several protocol layers with a destination address apportioned between the service information fields of these various protocol layers, the DTE function must, for each packet made available, detect the various layers of protocols and utilize them to extract therefrom the final destination address of the packet, then compare this final destination address with those of the various reception ports of the device concerned so as to retain the packet only when there is a match between its final destination address and one or more addresses of reception ports of the device concerned.

To carry out these operations on each packet made available, it is customary for a DTE function to operate in two steps: a first step of determining the final destination address of the packet by detecting its various protocol layers and analyzing the service information fields relevant to the final destination address of the packet in the various protocol layers detected, and, a second step of searching for the matches between the final destination address read from the packet and addresses of the various reception ports of the device that are mustered in a directory of final addresses that is specific to the device.

The desire for diversification of data transmission networks, for standardization of interfaces for accessing these networks and for increasing the variety of the messages exchanged between attached devices leads to a requirement for the DTE function to take into account packets of ever more varied nature, that may implement diverse second level and third level protocols and to take into account, in respect of a device, greater numbers of reception ports adapted to the variety of the messages. This results in increased complexity of an operation of reading a packet final destination address because of the multiplicity of protocols to be taken into consideration and an increase in the complexity of the operation of searching for a match at the level of the directory of addresses, by reason of an increase in the length of the packet final destination addresses and of the complete addresses of reception ports that is imposed by the diversity of protocols to be processed, and by reason of an increase in the stored number of addresses in the directory of final addresses, consequent upon the increase in the number of reception ports of a device.

Moreover, in embedded real-time applications, constraints regarding quality of service and guarantee of conveyance of messages to the reception ports within a bounded time span prohibit the creation of latency in case of saturation of the network by a large number of packets of small size. This requires the DTE function to be able to process a packet on each incoming path within the time necessary for the reception of the packet of minimum size.

All of this conspires to increase the computational capacities demanded of the attached device or of its interface for access to the network for the DTE function, this amplification being further augmented by the constant increase in the bit rates of networks.

There is therefore a need for methods making it possible to fulfill a DTE function with a minimum of computational capacity.

The aim of the present invention is to meet this need.

SUMMARY OF THE INVENTION

Its subject is a method of selecting and sorting data packets made available to device, by at least one packet data transmission network having a packet format able to comply with three levels of protocols:

a first level protocol corresponding to a network transmission physical layer, governing the general format of a packet and imposing the presence in a packet, on the one hand, of a so-called first level payload data field and, on the other hand, of so-called first level service information fields, including one so-called physical layer destination address, assigned to a first destination address and another assigned to a second level protocol identifier, a second level protocol governing the format of the first level payload data field and able to impose a partition of the first level payload data field into a so-called second level payload data field and into the so-called second level service information fields, of which one, the so-called second level destination address is assigned to a second destination address, and including one other assigned to a third level protocol identifier, as well as other possible fields controlling the fragmentation of the payload transported by the second level of protocol into one or more payloads transported by the possible third level protocol and a possible third level protocol governing the format of the second level payload data field and able to impose a partition of the second level payload data field into a so-called third level payload data field and into service data fields some of which may exist only in the first of the fragments conveying the payload of the second level protocol.

This method includes the steps of:

constructing a directory of so-called lower level addresses mustering, in the form of a list of elements, the various values taken by the addressing information appearing in the service information fields of the protocols of the first two levels when they relate to the device, constructing a directory of so-called higher level addresses mustering, in the form of a list of elements, the various values taken by the addressing information appearing in the service information fields of the protocols of levels higher than the second level when they relate to the device, establishing, for each element of the list of the directory of lower level addresses a compatibility link with one or more elements of the list of the directory of higher level addresses, this compatibility link signaling, in respect of two linked elements, of simultaneously being in the service information fields of the same packet, establishing for each element of the list of the directory of higher level addresses, an assignment link to at least one reception port of the device, and for each packet made available to the device by the data transmission networks:

reading the addressing information contained in the service information fields of the protocols of the first and second levels, searching for a match between the addressing information read from the service information fields of the protocols of the first and second levels and an element of the list of the directory of lower level addresses, in the absence of any matching element, rejecting the packet, in the presence of a matching element, taking into consideration the compatibility link of the matching element so as to search through the list of elements of the higher levels addressing directory, for the compatible elements, reading the addressing information contained in the service information fields of the protocols of levels higher than the second, when addressing information contained in the service information fields of the protocols of levels higher than the second are present, searching for a match between this information and one of the compatible elements of the list of the directory of higher level addresses, in the absence of matching elements, rejecting the packet, in the presence of a matching element, selecting the packet made available, taking into consideration the assignment link of the matching element, addressing the useful data of the packet to the reception ports of the device that are designated by the assignment link, and creating, if it does not already exist, an allocated message descriptor establishing a relation between the reception ports designated by the assignment link, the compatibility link and the value of a second level service information field assigned to a message fragment identification so as to make it reconcile later, the incoming fragments not possessing any service information fields of the protocols of levels higher than the second, when addressing information contained in the service information fields of the protocols of levels higher than the second are not present, searching through the open allocated message descriptors for a match at the level of the compatibility link and of the value of a second level service information field assigned to a message fragment identification, in the absence of matching elements, rejecting the packet, in the presence of a matching element, selecting the packet made available, taking into consideration the assignment link of the matching element, addressing the useful data of the packet to the reception ports of the device that are designated by the assignment link, and searching through the service information fields of the second level of the packet for an end of message information item making it terminate the allocated message descriptor considered.

Advantageously, the searches for a match are made within the lists of the elements of the directories of lower level and of higher level addresses by following a dichotomy procedure in previously ordered lists consisting of repeatedly subdividing in two parts the previously ordered lists until a matching element is found, thereby making it possible to guarantee a minimum and bounded search time.

Advantageously, the elements of the directory of lower level addresses are stored in a first table, their addresses within this table identifying the compatibility links associated with them.

Advantageously, the elements of the directory of higher level addresses are stored within a second table, each of them being associated, within this second table with a compatibility link and with an assignment link.

Advantageously, when the reception of packets is done on several redundant paths, the search for an allocated message descriptor is done on all the paths so as to take account of the fact that the initial packet that gave rise to the creation of the allocated message descriptor may have been received previously on another path.

Advantageously, when the network is an Ethernet network with packets respecting a first level protocol of MAC type and a second level protocol of IP type, each element of the directory of lower level addresses holds at least one particular value of the MAC destination address field and one particular value of the IP destination address field.

Advantageously, when the network is an Ethernet network with packets respecting a first level protocol of MAC type imposing, among the service fields of a packet, a field identifying the protocols respected by the packets at the higher levels and a second level protocol of IP type, each element of the directory of lower level addresses holds at least one particular value of the MAC destination address field, one particular value of the IP destination address field and a flag for invalidating the particular value of the IP destination address field in case of non-recognition of an IP type second level protocol.

Advantageously, when the network is a duplicate network consisting of two independent Ethernet networks each having access to the device, each of the two Ethernet networks having packets respecting a first level protocol of MAC type and a second level protocol of IP type, and when the device is able to identify the network or networks of origin of the packet, each element of the directory of lower level addresses holds at least one particular value of the MAC destination address field, one particular value of the IP destination address field, an identifier of the network or networks of origin of the packet compatible with these particular values of MAC and IP destination address field, and a validation flag for the identifier of the network or networks of origin.

Advantageously, when the packets of the network respect a first level protocol of MAC type imposing, among the service fields of a packet, a field identifying the protocols respected by the packets at the second level, a second level protocol of IP type and a third level protocol belonging to a group of protocols containing the UDP and TCP protocols, each element of the directory of higher levels holds at least one particular value of destination port UDP/TCP address field and a double flag for validating the particular value of destination port UDP/TCP address field identifying at the same time a third level protocol compatible with said particular value of destination port UDP/TCP address field.

Advantageously, when the network is a duplicate network consisting of two independent Ethernet networks each having access to the device, each of the two Ethernet networks having packets respecting a first level protocol of MAC type, a second level protocol of IP type and a third level protocol belonging to a group of protocols containing the UDP and TCP protocols, and when the device is able to identify the network or networks of origin of the packet, each element of the directory of higher levels holds at least one particular value of destination port UDP/TCP address field, a double flag for validating the particular value of destination port UDP/TCP address field identifying at the same time a third level protocol compatible with the particular value of destination port UDP/TCP address field, an identifier of the network or networks of origin of the packets that are compatible with this particular value of destination port UDP/TCP address field, and a validation flag for the identifier of the network or networks of origin.

BRIEF DESCRIPTION OF THE DRAWINGS

Other characteristics and advantages of the invention will emerge from the description hereinbelow of an embodiment given by way of example. This description will be offered in conjunction with the drawing in which.

a FIG. 1 is a diagram showing two devices intercommunicating by way of two distinct data transmission networks, one of the devices having its structure more detailed as to demonstrate the construction of its accessways to the networks, a FIG. 2 details a packet format used by the data transmission networks shown in FIG. 1, a FIG. 3 is a chart illustrating a possible decomposition, into elementary steps, of the select and sort operations that have to be conducted by a device from among the information passing within its reach, at the level of its accessways to transmission networks.

DESCRIPTION OF THE PREFERRED EMBODIMENT

Figure 2:
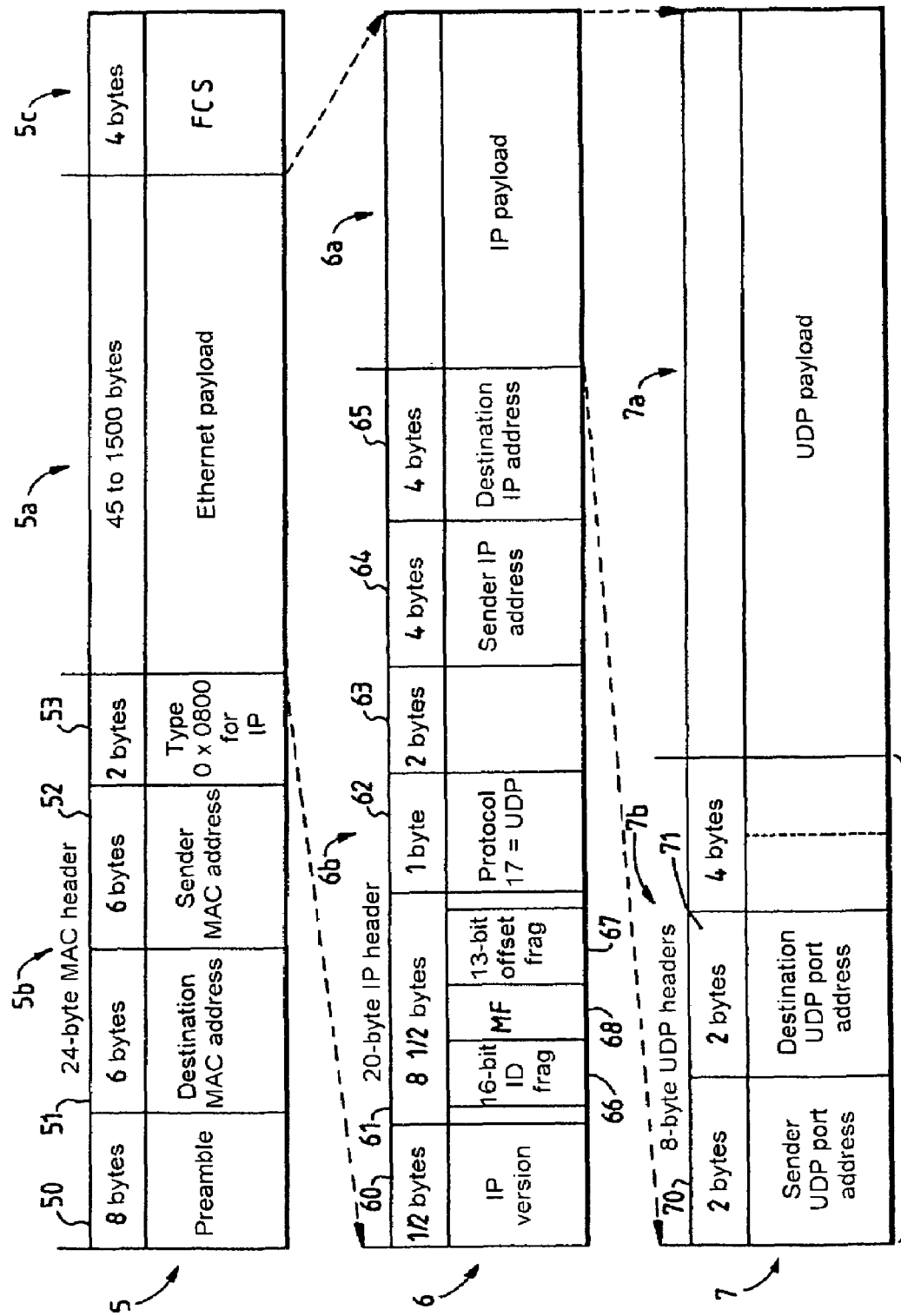

In FIG. 1, two devices I, II indexed by 1, 2 are separated by a greater or lesser distance and intercommunicate across two distinct transmission networks Na, Nb indexed by 3, 4. Each device 1, 2 is provided with a main circuit 10 executing the fundamental tasks for which it was designed and with a network interface 11 controlling the accessways of the main circuit 10 of the device to the two transmission networks Na, Nb 3, 4.

In the receive direction, which will be the only one described hereinbelow, the network interface 11 has the tasks of detecting the messages arriving at the network of accessways of device 1, of selecting, from among the messages detected on the network accessways, those actually relevant to the device and of sorting the messages selected as a function of their nature so as to present them in an ordered manner to the main circuit 10 of the device 1.

The detection of the messages, at the level of the accessways to the networks 3, 4 on the physical propagation media used by the networks 3, 4 and their setting into binary form is down to analog reception circuits PHY A, PHY B indexed by 110, 111 whose composition is very dependent on the characteristics of the propagation media of the networks. The selection, from among the messages detected on the accessways of device 1 to the transmission networks 3, 4 is set into binary form by the analog reception circuits 110, 111 for receiving messages relevant to device 1 and their sorting as a function of their nature, implement purely logic processing of sequential and/or combinatorial types, which may be carried out, as represented, with the aid of a microprocessor-based logic automaton 112 harnessing a random access work memory 113 and a random access mail memory 114. The random access work memory 113 serves for the temporary storage of the binary elements of the messages detected on the network accessways of device 1, by the analog reception circuits 110, 111 for as long as the select and sort operations. In various slots called reception ports, the mail memory 114 gathers the messages resulting from the selection, sorted by nature. It is intended to serve as inbox for mail in respect of the main circuit 10 of device 1 which can consult it directly or through the logic automaton 112.

Within the framework of a packet data transmission network, the messages conveyed, at the level of the physical medium used for transmission within the network, the ambient medium (wireless transmission) or electrical or optical cables (wire transmission) have the form of packets constructed of strings of binary elements or datagrams modulating a transmission signal and flowing one behind another over the transmission links of the network.

The datagram constituting a packet holds useful or payload data of the network and service information allowing the routing of the packet within the transmission network and the signaling of certain characteristics of the packet that are useful for its utilization in the destination installations. Its format or organization complies with precise rules, the so-called physical layer or first level protocol that are known to all the participants in the network. The useful data of a packet are mustered within a so-called payload data field that is itself subject to a precise organization, known to the destination devices, often of the same kind as that of a packet, with once again, a payload data field and service information fields. This organization of the payload data field of a packet complies with so-called logical layer or second level protocol rules. The payload data field defined by the second level protocol can itself have a format defined by a third level protocol and so on and so forth, so that it often transpires that there is a packet format respecting several layers of protocols.

Within the more general framework, the packet data transmission networks 3, 4 convey several varieties of packets distinguished by their formats that do not respect, at one level or another, the same types of protocol and several varieties of packets are relevant to the attached installations 1, 2. Within this framework, the packets made available to device 1, 2 by the networks 3, 4 and relevant to this device 1, 2 must be sorted by the automaton 112 as a function of their variety of membership and be found in the mail memory 114, in distinct storage queues subsequently referred to as reception ports.

The selection, from among the packets detected on the accessways of a device 1, 2 to the transmission networks 3, 4 and set into binary form by the analog reception circuits 110, 111, of the packets relevant to the device 1, 2 and their sorting as a function of their nature by the automation 112 are based on:

an assignment of network addresses specific to each attached device 1, 2 and made available to all the participants of the networks, an assignment of device addresses specific to each reception port of the mail memory of a device, the presence, in each packet, of service information making it possible to ascertain the network address or addresses of the destination device or devices, and, within the destination device or devices, the device address or addresses of the reception port or ports concerned, and a search for a match between the network address and the device address of the destination party or parties, extracted from the service information fields of a packet and the network address of the device concerned and a device address of the reception ports of the device concerned.

Customarily, the search for a match between the address of the destination party figuring in the service information of the packet and the network address of the device concerned, and the device addresses of the reception ports of this device is done either, in steps, progressively, or globally.

The progressive way consists in taking account separately of the various protocol layers of a packet, commencing with the first level protocol of the physical layer. Each protocol is taken into account by extracting from the service information fields of the protocol considered the information regarding the destination address found therein, by searching for a match with a directory mustering the various values that said information can take when the packet is destined for one or more reception ports of the device concerned and by rejecting the packet in the absence of a match or passing to the utilization of the protocol of immediately higher level in the presence of a match. The directory consulted at each protocol level is specific to this level and split into subsets of elements linked to the elements of the directory of immediately lower level. An ever more trimmed destination address is thus extracted from the packet until the exact address, networks and device, of the destination reception port or ports is reached.

The global way consists in extracting a complete destination address, networks and device, from the service information of the entire set of protocols of various levels applied to the packet and in comparing this complete destination address with a single directory holding the complete addresses, device and networks, of the reception ports of the device concerned.

The progressive procedure has the advantage of making it possible to break down the search for a match by dichotomy with, at each step, a consultation of a directory of addresses holding a small number of partial and simplified addresses reducing the complexity of the operations of comparison on which a search for a match is based but it multiplies up the intermediate steps whereas the global procedure has the advantage of being direct but requires the consultation of a single directory that can hold a large number of complete addresses, networks and device, that may give rise to a significant number of complex comparison operations. Both procedures have the drawback of requiring considerable computational power when the bit rate of the transmission networks is high.

Proposed here is a middle procedure consisting in considering the protocols of first and second level as one whole forming a superprotocol, the protocols of levels higher than the second as another whole forming another superprotocol and in applying the progressive procedure at the level of the superprotocols, thereby limiting its steps to two in number. This approach is all the more justified when the service information of the protocols of high rank may not be present in the packet owing, in particular, to the fragmentation of the payload of the second level protocol into several packets.

Detailed hereinbelow is the application of this middle selection and sorting procedure to a packet format used by the networks 3, 4 respecting at the first level, that of the physical layer, an MAC Ethernet protocol complying with the IEEE802.3 standards, at the second level, an IP Internet protocol, preferably in its version 4, with, at the third level, several possibilities of protocol, either a proprietary protocol, or else an Internet protocol of TCP, UDP or ICMP type.

FIG. 2 details the format of such a packet in the case of a third level protocol of UDP Internet type. The global format of the packet imposed by the MAC type first level protocol appears in the upper array 5. The format of the Ethernet payload data field constituting the payload of the network, which is imposed by the IP Internet type second level protocol, is illustrated by the middle array 6. That of the IP useful data field or IP payload imposed by the UDP Internet type third level protocol is illustrated by the lower array 7.

As shown by the upper array 5 of FIG. 2, the MAC Ethernet protocol imposes that the datagram of a packet comprise a payload data field 5a of between forty-five and fifteen hundred bytes in length, preceded by a twenty-four byte header, the so-called MAC header 5b dedicated to service information of the first level, that of the physical layer, and followed by a cyclic redundant code 5c also called FCS (the acronym standing for "Frame Control Sequence") occupying four bytes and pertaining to the entire packet preamble excepted.

The MAC header 5b is composed of a preamble 50 of eight bytes serving for synchronization, the packets being transmitted asynchronously, followed by a destination MAC address 51 of six bytes, a sender MAC address 52 of six bytes and a service information item 53 on two bytes, that is devoted either to the length of the packet in bytes if its value is less than 1536, or to the type, that is to say to the second level protocol respected by the MAC payload data field 5a, when its value is greater than 1536. When the MAC payload data field respects an IP protocol, the expected value of the service information item 53 is 0800 in hexadecimal.

When, as assumed, the MAC payload data field 5a of a packet respects an IP protocol, the MAC header 5b holding a type information item 53 having the hexadecimal value 0800, the datagram of which it is composed is in turn broken down, as shown by the middle array 6 of FIG. 2, into an IP payload data field 6a constituting the payload at the IP protocol level, preceded by a header 6b the so-called IP header. In the example described, this header corresponds to an IPV4 protocol with no optional fields and occupies twenty bytes devoted to service information relevant to the second level, that of the IP protocol often designated the logical transport layer.

The IP header 6b comprises a first service information field 60, half a byte in length, identifying the version used of the IP protocol and having, for version 4, the expected binary value 0100. This first service information field 60 is followed by a set 61 of seven other service information fields occupying eight and a half bytes, including a fragment identifier field 66 of 2 bytes allowing the IP layer during reception to reconcile all the packets belonging to one and the same message, a "fragment offset" field 67 of 13 bits making it possible to reorder the information snippets contained in the reconciled packets and an MF flag 68 signaling by taking the value zero that the packet corresponds to a message final fragment, then by a service information field 62, one byte in length, identifying the third level protocol respected by the IP payload data field 6a. When, as assumed here, the IP payload data field 6a respects the UDP Internet protocol, the expected value of the service information item 62 is 17 in decimal. Following the service information field 62 identifying the third level protocol is another service information field 63, two bytes in length, then a service information field 64, four bytes in length, devoted to a sender IP address and a service information field 65, four bytes in length, devoted to a destination IP address.

When, as assumed, the IP payload data field 6a respects a UDP protocol, the IP header 6b holding a third level protocol identifier 62 having the decimal value 17, the datagram of which it is composed is in its turn broken down, as shown by the lower array 7 of FIG. 2, into a UDP payload data field 7a constituting the payload at the UDP protocol level, preceded by an eight-byte header 7b the so-called UDP header devoted to service information relevant to the third level, that of the UDP protocol often designated the logical network layer. The information item contained by the header 7b is present only in the packets corresponding to the first fragment of a fragmented IP payload. Such packets are identifiable by null "fragment offset" field (67).

The UDP header 7b comprises a first service information field 70, two bytes in length, devoted to a sender UDP address identifying a send port in the sender device from which the payload contained in the UDP data field 7a originates, followed by a second server information field 71, two bytes in length, devoted to a destination UDP address identifying a reception port in the destination device and by a set 72 of two other service information fields occupying the remaining four bytes.

A device 1, 2 concerned with the variety of packets respecting the MAC/IPv4/UDP protocol layers whose format has just been detailed in FIG. 2 and with the other varieties of packets also present, namely: the variety of packet respecting the MAC/IPv4/TCP protocol layers and the variety respecting the MAC/IPv4/ICMP protocol layers, should comprise in its mail memory 114, at least one reception port assigned to each of these categories of packets. Furthermore, it may comprise other reception ports for the packets that are addressed to it but whose three protocol levels may not be completely utilized, either because their second level protocol is not of IPv4 type, or because their third level protocol does not correspond either to the UDP protocol, or to the TCP protocol, or to the ICMP protocol.

The select and sort operations then consist, in respect of the network interface 11 of device 1, 2 in selecting from the packets made available to the device 1, 2 by the networks 3, 4 those that are destined for it and in directing them, as a function of their variety, toward the appropriate reception port or ports of the mail memory 114 of the device. They are undertaken by the automaton 112 of the network interface of device 1, 2 on the binary versions or datagrams of the packets that are placed in the work memory 113 by the analog reception circuits 110, 111 interposed in front of the accessways of the device 1, 2 to the networks 3, 4.

Since, in order to tag the start and end of a packet, the analog reception circuits 110, 111 utilize the preamble (50 FIG. 2) of the header and the cyclic redundant code final field 5c of the MAC Ethernet protocol applied to the first level of the physical layer, they implicitly effect a first filtering and place only datagrams whose format corresponds to an MAC Ethernet protocol into the work memory 113.

Figure 3:
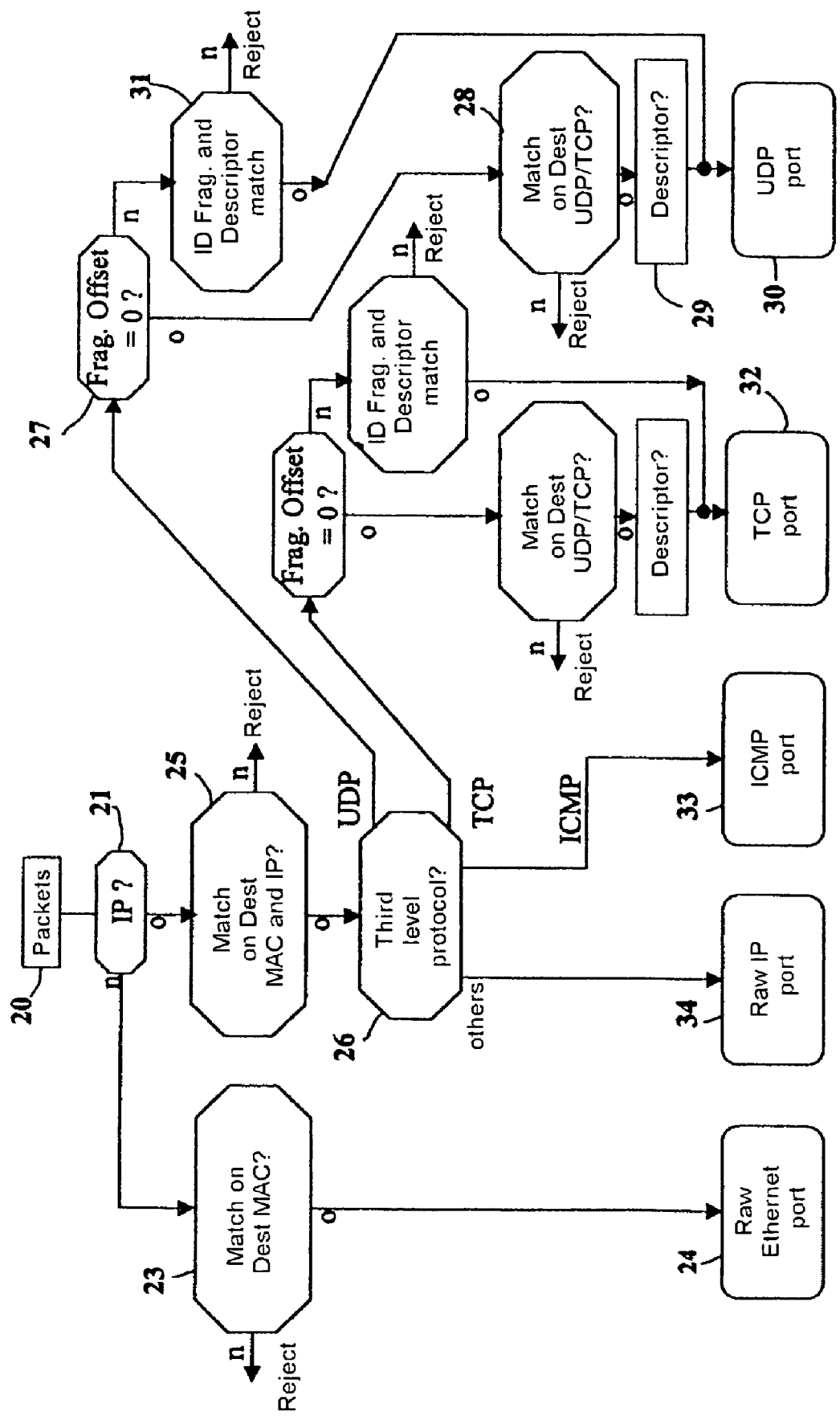

Adherence to a first level MAC Ethernet protocol by the datagrams of packets supplied by the analog reception circuits 110, 111 having been effected, the select and sort operations performed by the automaton 112 begin, as represented in the logic chart of FIG. 3, with a check 21 of the use of a second level protocol of IP type. This check 21 is made by verifying the value of the identifier of the second level protocol of the packet figuring, as packet header, in the service information field (53 FIG. 2) of the MAC Ethernet protocol devoted to the type, which identifier must equal 0800 in hexadecimal if the second level protocol is indeed to be of IP type.

When the check 21 fails, implying that the packet does not use an IP protocol at the second level, the packet is subjected to a search for a match 23 between the value of the service information field that are devoted to the destination MAC address (51 FIG. 2) and those of the destination MAC addresses assigned to the device concerned. In the absence of a match, the packet is rejected. In the presence of a match, the datagram figuring in the payload data field (6a FIG. 2) is deposited in a particular reception port 24 of the mail memory 114, the so-called raw Ethernet reception port.

When the check 21 is positive, demonstrating the use by the packet, at the second level, of an IP protocol, the packet is subjected to a search for a match 25 between the combination of the values of the service information fields devoted to the destination MAC address (51 FIG. 2) and to the destination IP address (65 FIG. 2) and the combinations of destination MAC and destination IP addresses assigned to the device concerned. It is rejected in the absence of a match. On the other hand, if a match is found, it is subjected to an identification 26 of the third level protocol used by the packet.

This identification of third level protocol is done by polling the value taken by the third level protocol identifier figuring, as packet header, in the service information field (62 FIG. 2) of the IP protocol.

When the third level protocol identifier present in the packet header has the value 17 in decimal corresponding to a UDP protocol, a message fragmentation investigation is superimposed on the search for a destination port since only a packet corresponding to a first fragment of a message is provided with a UDP destination address.

This fragmentation investigation is done by analyzing the fragment identification, fragment Offset and final fragment flag fields (66, 67, 68 FIG. 2).

If the analysis 27 of the fragment Offset field shows that it has the value zero indicating that the packet is a first message fragment containing a UDP destination address, the packet is subjected to a search for a match 28 between the value of the service information field of the packet devoted to the destination port UDP address (71 FIG. 2) and those of the destination UDP addresses assigned to one or more reception ports reserved for the UDP protocol in the mail memory 114 of the device concerned. When the search for a match fails, the packet is rejected. On the other hand, at the first match found, there is allocation 29 of a message descriptor to the packet if such a descriptor does not already exist, and deposition of the datagram of the payload data field of the packet in the reception port 30 in the mail memory 114 of the device, whose address corresponds to the destination port UDP address of the packet.

A message descriptor establishes the relation between all the packets respecting the UDP/IPv4/MAC protocol layers and having the same fragment identifier value. It is stored, with its fellows in the work memory. Created with a packet corresponding to a first message fragment, it is destroyed with the packet corresponding to the last message fragment signaled by an end of message flag MF (68, FIG. 2) having the value zero.

For simplification, the UDP reception ports have been symbolized in FIG. 3 by a single reception port referenced UDP reception port and indexed by the numeral 30.

If the analysis 27 of the Offset fragment field shows that it has a value different from zero indicating that the packet is not a first message fragment and therefore does not comprise any destination UDP address, the packet is subjected to a search for membership in a message destined for the device, by searching 31 for a message identifier allocated to the value taken by its fragment identification field (66 FIG. 2). If no message identifier has been allocated, the packet is rejected. If a message identifier has been allocated, the datagram of the payload data field of the packet is deposited in the reception field of the device designated by the message descriptor.

When the third level protocol identifier present in the packet header has the value 6 in decimal corresponding to a TCP protocol, the packet undergoes an analysis similar to that carried out in respect of a UDP third level protocol, the datagram of its payload data field being deposited, should the result of the analysis be favorable, in one or more reception ports reserved for the TCP protocol in the mail memory 114 of the device. For simplification, the TCP reception ports have been symbolized in FIG. 3 by a single reception port referenced TCP reception port and indexed by the numeral 32.

When the third level protocol identifier present in the packet header has the value 1 in decimal corresponding to an ICMP protocol, the datagram of the payload data field of the ICMP protocol is deposited in a particular reception port 33, the so-called ICMP reception port, with no prior search for a match of destination address since this protocol does not specify one.

When the third level protocol identifier present in the packet header has none of the three previous values signaling the use by the packet of a third level protocol not corresponding to any of the UDP, TCP or ICMP previous protocols, the payload data field of the IP protocol (6a, FIG. 2) is deposited in a particular reception port 33 the so-called raw IP reception port.

During select and sort operations performed on a packet in accordance with the logic chart of FIG. 2, there is always a first search for a match performed either on the Destination MAC address (23) or on a combination of the Destination MAC and Destination IP addresses (25) figuring in the header of the packet and possibly a second search for a match performed on the destination port UDP/TCP address (27, 29) when it figures in the header of the packet.

To facilitate and speed up the executions of these searches for a match, each device harnesses two directories of addresses, the one of so-called lower levels, the other of so-called higher levels stored in two tables placed in the work memory 113.

The directory of lower level addresses catalogs the Destination MAC addresses and the combinations of Destination MAC and Destination IP addresses which may be in the header of a packet destined for the device concerned.

The directory of higher level addresses catalogs the destination port UDP/TCP addresses which may be in the header of a packet destined for the device considered, and destination port dummy UDP/TCP addresses used as directory exits in the absence of any second search for a match. Within the table which stores this directory of higher level addresses, each destination port dummy or non-dummy UDP/TCP address is accompanied by a compatibility link and by an assignment link.

A compatibility link targets, in the directory of lower level addresses, a Destination MAC address or a combination of Destination MAC and IP addresses. Taken together, the compatibility links target all the directory elements of lower level addresses and constitute an accessway to the directory of higher level addresses from the elements of the directory of lower level addresses. For convenience, a compatibility link is identified by the MAC/IP address No. of the element that it targets in the directory of lower level addresses. A compatibility link can be identified in another way but it is then necessary for it to be associated explicitly with each element of the directory of lower level address within the table which stores this directory.

The compatibility link of a destination port non-dummy UDP/TCP address targets the combination or combinations of the Destination MAC and Destination IP address with which this destination port UDP/TCP address may be found in the header of a packet. The compatibility link of a destination port dummy UDP/TCP address targets, in the directory of lower level addresses, either one or more destination MAC addresses not combined with a destination IP address, or one or more combinations of Destination MAC and Destination IP addresses.

An assignment link identifies the address or addresses of one or more reception ports within the mail memory 114 of the device considered.

As a second search for a match on the destination port UDP/TCP addresses necessarily follows a first search for a match on the permitted combinations of Destination MAC and Destination IP addresses, the presence of the compatibility links relating all the elements of the directory of lower level addresses to elements of the directory of higher level addresses makes it possible to reduce the domain of the second search for a match to just the elements of the list of the directory of higher level addresses exhibiting a compatibility link targeting the first element of the directory of lower level addresses that appeared as matching during the first search for a match.

The first search for a match is done by reviewing the elements of the directory of lower level addresses, grouped together by values of destination MAC address, a group of elements corresponding to one and the same Destination MAC address value always beginning with an isolated MAC address so that it gives rise to the first match detected in case of a search for a match on the Destination MAC address alone (23 FIG. 2). This first match on an isolated MAC address value in the directory of lower level addresses will lead through the compatibility link, in the directory of higher level addresses, to a destination port dummy UDP/TCP address and then, through the assignment link of this destination port dummy UDP/TCP address, to one or more reception ports of the mail memory 114 of the device.

The second search for a match is done in a similar manner to the first, by reviewing the elements of the directory of higher level addresses.

Figure 4:
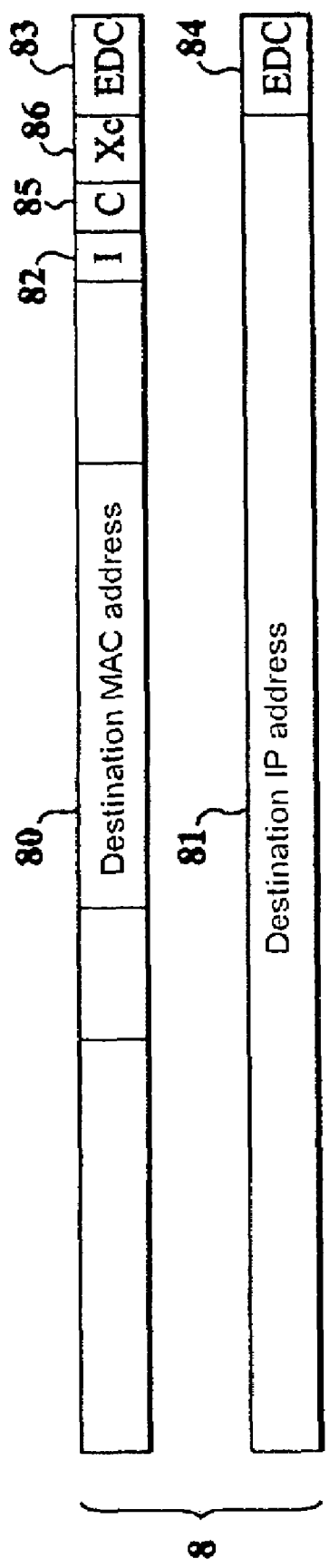
FIGS. 4 and 5 show the compositions of the elements of two directories of addresses, the one of so-called lower levels and the other of so-called higher levels, used for searches for a match during select and sort operations that run in the manner illustrated in FIG. 3, a FIG. 6 represents an allocation list of descriptors of a message associated with a given compatibility link allowing the fragment identifier to be reconciled with the reception port number, and a FIG. 7 is a chart illustrating the succession of the steps for selecting and sorting packets in the case of a higher rank protocol of UDP type and for a non-redundant reception.

FIG. 4 details the composition of an element 8 of the directory of lower level addresses of a device. This element 8 comprises at least three information fields: a first information field 80 containing a Destination MAC address assigned to the device, a second information field 81 containing a destination IP address, either actually assigned to the device, in the sense that it may be found, in combination with the destination MAC address occupying the information field 80, in a packet header relevant to the device, or dummy, and a third information field 82 holding a flag I signaling the nature, actual or dummy, of the destination IP address contained in the information field 81. In the case of a dichotomy search, the field 82 participates in the search and must be compared with an appropriate decoding of the type field (53) and possibly of the IP version field (60) during the search for a match.

When the destination IP address contained in the information field 81 is signaled as dummy by the flag I, the directory element corresponds to an isolated destination MAC address relevant to the device concerned and for which the IP layer processing service is not required. When the destination IP address contained in the information field 81 is signaled as actual by the flag I, the directory element corresponds to a combination of a Destination MAC address and a Destination IP address relevant to the device concerned.

In addition to these three information fields 80, 81, 82, a lower level addresses directory element 8 assigned to a device can comprise other information fields such as information fields 83, 84 assigned to error correction codes EDC.

When, as described, the devices 1, 2 can converse by way of two different transmission networks 3, 4, the identity of the network or channel from which the packet examined originates can easily be tagged at the level of the network interface 11 and can constitute a useful information item for the utilization of the packet. In this case, the expected value C of the channel identity for a packet, whose destination MAC address or whose combination of Destination MAC and Destination IP address correspond to the directory element 8 concerned, is systematically added to this element 8 in a specific information field 85, with a flag Xc placed in another specific information field 86 signaling whether the channel information item C figuring in the information field 85 of the directory element 8 does or does not have to be taken into consideration during a search for a match.

The operations of selecting and sorting packets at the inputs of a device may call upon, during the first search for a match in the lower level addresses directory assigned to the device, a more thorough comparative analysis pertaining also to other service information of the first two protocol levels of the packet. In this case, other information fields may be incorporated into the lower level addresses directory element 8 assigned to a device as signaled by the presence of empty slots in FIG. 4.

In the case where a dichotomy search among the elements of the list of addresses of the directory of lower levels must be implemented, it is necessary to organize this list with a strict order relation making it possible, during the dichotomy search, to ascertain the direction in which the search should continue if the match is not achieved. The fields participating in this order relation are the fields 80, 81, 82, 85 and 86.

Figure 5:
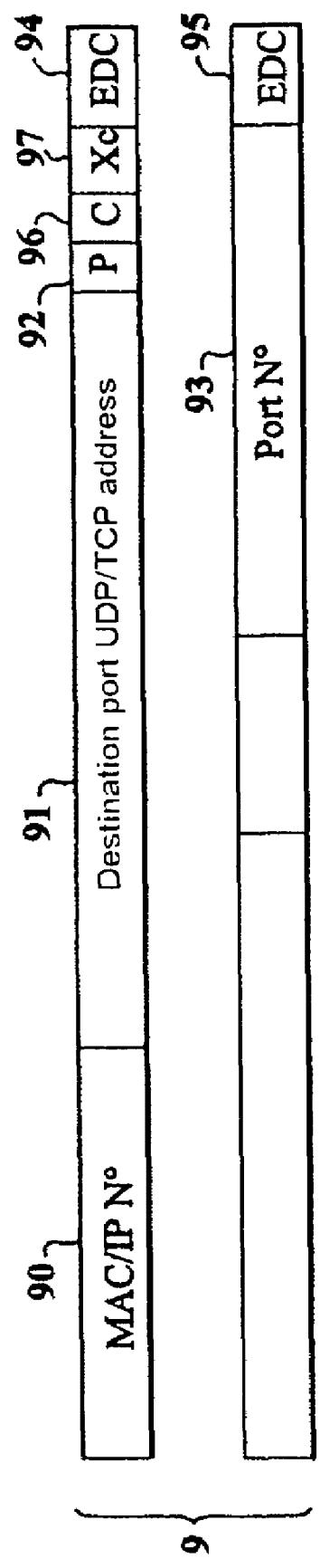

FIG. 5 details the composition of an element 9 of the directory of higher level addresses of a device. This element 9 comprises at least four information fields: a first information field 90 containing a compatibility link consisting here in the address of a target element in the directory of lower level addresses of the device, a second information field 91 containing a destination port UDP/TCP address, either actually assigned to the device, in the sense that it may be found in the information field (71 FIG. 2) as packet header relevant to the device, or dummy, a third information field 92 holding a double flag P signaling the nature, actual or dummy, of the destination UDP/TCP address contained in the information field 91 and a fourth information field 93 holding a reception port address of the mail memory 114 of the device.

The double flag P signals the nature, actual or dummy, of a destination port UDP/TCP address through the assignment of the directory element 9 concerned to a determined type of third level protocol: UDP, TCP, ICMP or other. When it identifies a UDP or TCP protocol, it indicates an actual nature whereas when it identifies an ICMP or other protocol, it indicates a dummy nature.

In the case of a dichotomy search, the field 92 participates in the search and must be compared with an appropriate decoding of the type field 53 and possibly of the IP version field 60 as well as of the Protocol field 62 during the search for a match.

When the destination port UDP/TCP address contained in the information field 91 is signaled as dummy by the double flag P, the directory element 9 corresponds to a port for which it is unnecessary to take account of a UDP or TCP port address.

The reception ports address contained in the information field 93 makes it possible, as soon as the match is found on the destination port UDP/TCP address in the directory of higher level addresses, be this match trivial, the destination port UDP/TCP address being dummy, or otherwise, the destination port UDP/TCP address being actual, to assign the useful data of each packet having satisfied the searches for a match to the suitable reception port or ports of the mail memory 114 of the device.

In addition to these four information fields 90, 91, 92, 93, a lower level addresses directory element 9 assigned to a device may also comprise other information fields such as information fields 94, 95 assigned to error correction codes EDC or information fields 96, 97 assigned respectively to a channel value C or network of origin and to a flag Xc signaling whether this channel information item C figuring in the directory element 9 does or does not have to be taken into consideration during a search for a match.

As before, the operations of selecting and sorting the packets at the inputs of a device may call upon, during the second search for a match in the directory of higher level addresses assigned to the device, a more thorough comparative analysis pertaining also to other service information of the third level of the packet. In this case, other information fields may be incorporated into the lower level addresses directory element 9 assigned to a device as signaled by the presence of empty slots in FIG. 5.

It is observed that the directory of higher level addresses serves also as matching table for the destination port dummy or non-dummy UDP/TCP addresses of the packets, and for the local addresses, only valid within a device, assigned to its various reception ports mustered within its mail memory 114. This enables the configuration of the reception ports of a device to be altered in a manner that is relatively independent of the transmission networks to which it is connected, the effect of a modification being limited to an update of the directory of higher level addresses of the device.

In the case where a dichotomy search among the elements of the list of addresses of the directory of higher levels has to be implemented, it is necessary to organize this list according to a strict order relation making it possible during the dichotomy search to ascertain the direction in which the search should continue if the match is not achieved. The fields participating in this order relation are the fields 90, 81, 82, 96 and 97.

FIG. 6 represents an example of a message descriptors 121 allocation list 120 allowing the allocation of the identifiers of message fragments to a reception port number. Such a list is stored in work memory. Each list is associated with a compatibility link. Each element of the list is associated with a message descriptor which is a space in work memory grouping together the pointers to each of the constituent fragments of the message and on which the IP layer relies in reception to reconstruct the IP payload.

Each element 121 possesses:

a fragment identifier field 122 receiving the value of the fragment identifier field extracted from the IP header during the allocation of the message descriptor associated with a new incoming message.

A bit U 123 indicating that the element is used or free. This bit is set to the active state upon the allocation of the message descriptor to a new incoming message, it is reset to the inactive state by the IP layer when the message descriptor has been utilized fully (message deposited fully in the mail memory or abandoned while all the latest fragments have been received on the input path or paths)

A port alias field 124 making it possible to retrieve the port corresponding to the message. This field is initialized on completion of the search in the directory of higher level addresses during the reception of the first fragment of the message. This field may for example code the port number directly, it may also advantageously code the address of the element of the second directory for which the match has been found. This therefore makes it possible to access the port number as well as the other information stored in this directory element.

Figure 7:
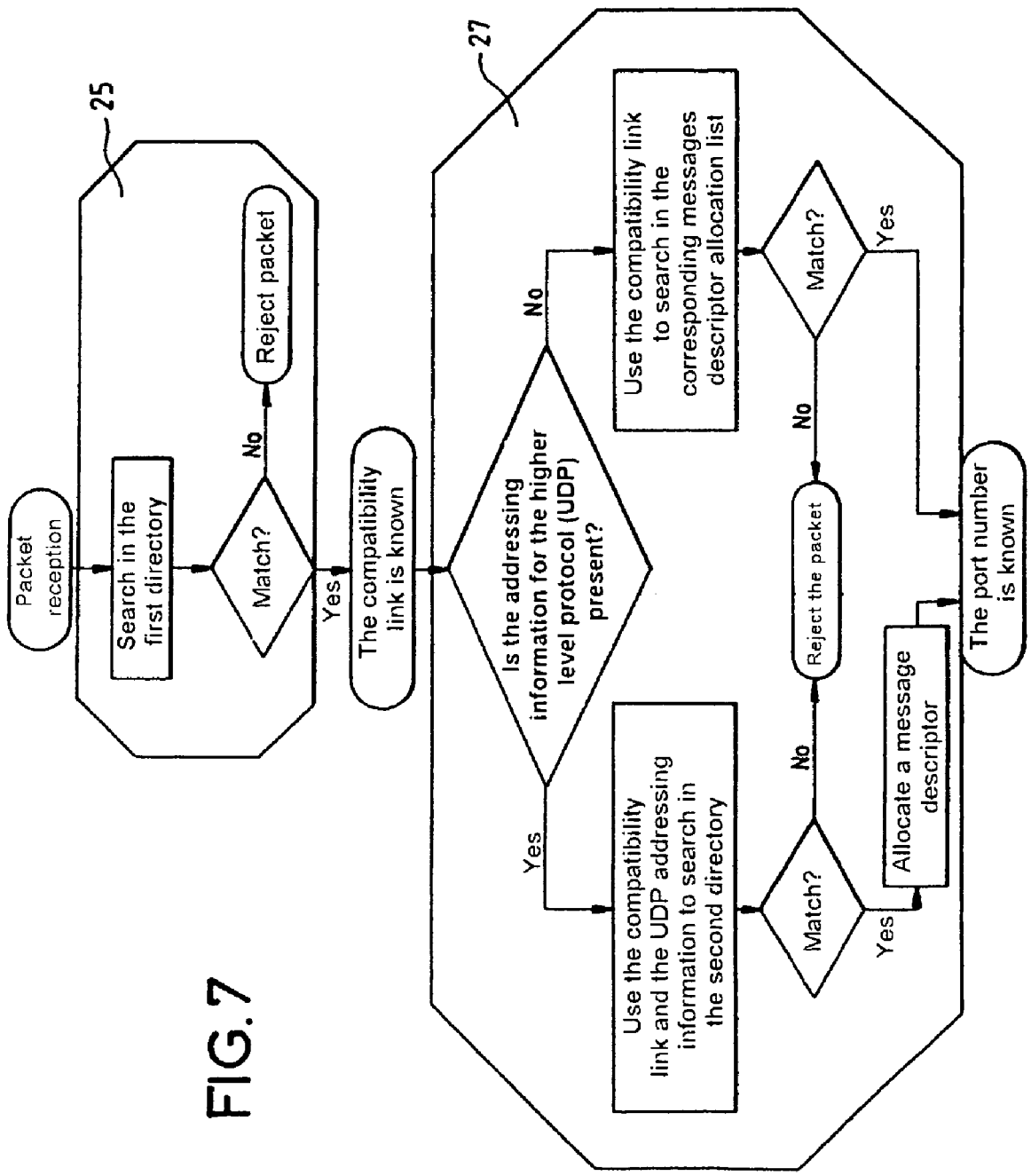

FIG. 7 represents in the form of a flowchart the succession of the activities in the exemplary case of UDP/IP reception for a non-redundant transmission. Steps 25 and 28 of FIG. 3 appear therein in greater detail. This FIGURE depicts the two possible branches of step 28.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A device linked to a data packet transmission network, the device comprising means for selecting and sorting data packets made available by at least one packet data transmission network having a packet format configured to comply with three levels of protocols, the three levels of protocols including:

a first level protocol corresponding to a network transmission physical layer, the first level protocol imposing a general format of a packet including a first level payload-data field and first level service information fields, including a first physical layer destination address, assigned to a first destination address and a second physical layer destination address assigned to a second level protocol identifier, a second level protocol imposing the format of the first level payload-data field with a partitioning of the first level payload-data field into a second level payload-data field and second level service information fields, of which one is a second level destination address assigned to a second destination address, and another second level destination address is assigned to a third level protocol identifier, and a third level protocol imposing the format of the second level payload-data field with a partition of the second level payload-data field into a third level payload-data field and into third level service data fields, said means for selecting and sorting data packets comprising:

means for constructing a lower level address directory mustering, in a form of a list of elements, the various values taken by the addressing information appearing in the service information fields of the protocols of the first two levels when they relate to the device, means for constructing a higher address directory mustering, in the form of a list of elements, the various values taken by the addressing information appearing in the service information fields of the protocols of levels higher than the second level when they relate to the device, means for establishing compatibility links that link each element of the list of the lower address directory with one or more elements of the list of the higher level address directory, these compatibility links signaling, in respect of two linked elements, of simultaneously being in the service information fields of the same packet, means for establishing assignment links that link each element of the list of the higher level address directory with at least one reception port of the device, and logic means for sorting each packet made available to the device by the data transmission networks by:

reading the addressing information contained in the service information fields of the protocols of the first and second levels, searching for a match between the addressing information read from the service information fields of the protocols of the first and second levels and an element of the list of the directory of lower level addresses, in the absence of any matching element, rejecting the packet, in the presence of a matching element, taking into consideration the compatibility link of the first matching element so as to select from the list of elements the higher levels addressing directory, the compatible elements, reading the addressing information contained in the service information fields of the protocols of levels higher than the second, when addressing information containing the service information fields of the protocols of levels higher than the second are present, searching for a match between this information and one of the compatible elements of the list of the directory of higher level addresses, in the absence of matching elements, rejecting the packet, in the presence of a matching element, selecting the packet made available, taking into consideration the assignment link of the matching element, addressing the payload data of the packet to the reception ports of the device that are designated by the assignment link, and creating, if it does not already exist, an allocated message descriptor establishing a relation between the reception ports designated by the assignment link, the compatibility link and the value of a second level service information field assigned to a message fragment identification so as to make it reconcile later, the incoming fragments not possessing any destination address information in the service information fields of the protocols of levels higher than the second, when addressing information contained in the service information fields of the protocols of levels higher than the second are not present, searching through the open allocated message descriptors for a match at the level of the compatibility link and of the value of a second level service information field assigned to a message fragment identification, in the absence of matching elements,
rejecting the packet,
in the presence of a matching element,
selecting the packet made available,
taking into consideration the assignment link of the matching element,
addressing the payload data of the packet to the reception ports of the device that are designated by the assignment link, and
searching through the service information fields of the second level of the packet for an end of message information item making it terminate the allocated message descriptor considered.

2. The device as claimed in claim 1, wherein the searches for a match are made by the logic sorting means within the lists of the elements of the lower level and higher level address directories by following a dichotomy procedure in previously ordered lists consisting of repeatedly subdividing in two parts the previously ordered lists until finding a matching element.

3. The device as claimed in claim 1, wherein the elements of the lower level address directory are stored in a first table, their addresses within this first table identifying the compatibility links associated with them.

4. The device as claimed in claim 1, wherein the elements of the directory of higher level address directory are stored within a second table, each of them being associated, within this second table with a compatibility link and with an assignment link.

5. The device as claimed in claim 1, linked to Ethernet networks with packets respecting a first level protocol of MAC type and a second level protocol of IP type wherein each element of the lower level address directory holds at least one particular value of the MAC destination address field and one particular value of the IP destination address field.

6. The device as claimed in claim 1, linked to Ethernet networks with packets respecting a first level protocol of MAC type imposing, among the service fields of a packet, a field identifying the protocol respected by the packets at the second level and a second level protocol of IP type, wherein each element of the lower level address directory holds at least one particular value of the MAC destination address field, one particular value of the IP destination address field and a flag for invalidating the particular value of the IP destination address field in case of non-recognition of an IP type second level protocol.

7. The device as claimed in claim 1, linked to a duplicate network consisting of two independent Ethernet networks each having access to the device, each of the two Ethernet networks having packets respecting a first level protocol of MAC type and a second level protocol of IP type, and having means for identifying the network or networks of origin of a packet, wherein each element of the lower level directory holds at least one particular value of the MAC destination address field, one particular value of the IP destination address field, an identifier of the network or networks of origin of the packet compatible with these particular values of MAC and IP destination address field, and a validation flag for the identifier of the network or networks of origin of the packet.

8. The device as claimed in claim 1, linked to Ethernet networks with packets respecting a first level protocol of MAC type imposing, among the service fields of a packet, a field identifying the protocols respected by the packets at the second level, a second level protocol of IP type and a third level protocol belonging to a group of protocols containing the UDP and TCP protocols, wherein each element of the higher level directory holds at least one particular value of destination port UDP/TCP address field and a double flag for validating the particular value of destination port UDP/TCP address field identifying at the same time a third level protocol compatible with said particular value of destination port UDP/TCP address field.

9. The device as claimed in claim 1, linked to a duplicate network consisting of two independent Ethernet networks each having access to the device, each of the two Ethernet networks having packets respecting a first level protocol of MAC type, a second level protocol of IP type and a third level protocol belonging to a group of protocols containing the UDP and TCP protocols, and having means for identifying the network or networks of origin of the packet, wherein each element of the higher level directory holds at least one particular value of destination port UDP/TCP address field, a double flag for validating the particular value of destination port UDP/TCP address field identifying at the same time a third level protocol compatible with said particular value of destination port UDP/TCP address field, an identifier of the network or networks of origin of the packets that are compatible with this particular value of destination port UDP/TCP address field, and a validation flag for the identifier of the network or networks of origin of the packet.

* * * * *